US007706610B2

(12) United States Patent
Zhang et al.

(10) Patent No.: US 7,706,610 B2
(45) Date of Patent: Apr. 27, 2010

(54) SEGMENTATION OF OBJECTS BY MINIMIZING GLOBAL-LOCAL VARIATIONAL ENERGY

(75) Inventors: Zhengyou Zhang, Bellevue, WA (US); Zicheng Liu, Bellevue, WA (US); Gang Hua, Evanston, IL (US)

(73) Assignee: Microsoft Corporation, Redmond, WA (US)

( * ) Notice: Subject to any disclaimer, the term of this patent is extended or adjusted under 35 U.S.C. 154(b) by 1009 days.

(21) Appl. No.: 11/291,309

(22) Filed: Nov. 29, 2005

(65) Prior Publication Data

US 2007/0122039 A1 May 31, 2007

(51) Int. Cl.
*G06K 9/34* (2006.01)
*G06K 9/46* (2006.01)
*G06K 9/66* (2006.01)
*G06K 9/48* (2006.01)

(52) U.S. Cl. ........................ 382/173; 382/199; 382/190
(58) Field of Classification Search .................. 382/173, 382/199
See application file for complete search history.

(56) References Cited

U.S. PATENT DOCUMENTS

| | | | | |
|---|---|---|---|---|
| 6,535,632 | B1 * | 3/2003 | Park et al. | 382/164 |
| 7,095,890 | B2 * | 8/2006 | Paragios et al. | 382/173 |
| 7,158,692 | B2 * | 1/2007 | Chalana et al. | 382/294 |
| 2002/0102023 | A1 * | 8/2002 | Yamauchi | 382/199 |
| 2006/0013482 | A1 * | 1/2006 | Dawant et al. | 382/173 |
| 2006/0039611 | A1 * | 2/2006 | Rother et al. | 382/199 |
| 2006/0159341 | A1 * | 7/2006 | Pekar et al. | 382/173 |
| 2006/0233455 | A1 * | 10/2006 | Cheng et al. | 382/274 |
| 2007/0003137 | A1 * | 1/2007 | Cremers et al. | 382/171 |
| 2007/0003138 | A1 * | 1/2007 | Hobson et al. | 382/173 |
| 2007/0014457 | A1 * | 1/2007 | Jolly et al. | 382/128 |
| 2007/0211940 | A1 * | 9/2007 | Fluck et al. | 382/173 |

OTHER PUBLICATIONS

Zhu, S.C., Yuille, A.: Region competition: Unifying snakes, region growing, and bayes/mdl for multiband image segmentation. IEEE Transaction on Pattern Recognition and Machine Intelligence 18 (1996) 884-900.
Paragios, N., Deriche, R.: Geodesic active regions and level set methods for supervised texture segmentation. International Journal of Computer Vision (2002) 223-247.

(Continued)

*Primary Examiner*—Samir A Ahmed
*Assistant Examiner*—Li Liu
(74) *Attorney, Agent, or Firm*—Lyon & Harr, LLP; Mark A. Watson

(57) ABSTRACT

An "Image Segmenter" provides a variational energy formulation for segmentation of natural objects from images. In general, the Image Segmenter operates by adopting Gaussian mixture models (GMM) to capture the appearance variation of objects in one or more images. A global image data likelihood potential is then computed and combined with local region potentials to obtain a robust and accurate estimation of pixel foreground and background distributions. Iterative minimization of a "global-local energy function" is then accomplished by evolution of a foreground/background boundary curve by level set, and estimation of a foreground/background model by fixed-point iteration, termed "quasi-semi-supervised EM." In various embodiments, this process is further improved by providing general object shape information for use in rectifying objects segmented from the image.

20 Claims, 8 Drawing Sheets
(5 of 8 Drawing Sheet(s) Filed in Color)

OTHER PUBLICATIONS

Rother, C., Kolmogorov, V., Blake, A.: "grabcut"—interactive foreground extraction using iterated graph cuts. ACM Transactions on Graphics (SIGGRAPH'04) (2004) 309-314.

Martin, D., Fowlkes, C., Tal, D., Malik, J.: A database of human segmented natural images and its application to evaluating segmentation algorithms and measuring ecological statics. In: 8th IEEE International Conference on Computer Vision. vol. 2. (2001) 416-423.

Kass, M., Witkin, A., Terzopoulos, D.: Snakes: Active contour models. International Journal of Computer Vision 1 (1987) 321-331.

Cohen, L.D., Cohen, I.: Finite-element methods for active contour models and balloons for 2-d and 3-d images. IEEE Transaction on Pattern Analysis and Machine Intelligence 15 (1993) 1131-1147.

Casselles, V., Kimmel, R., Sapiro, G.: Geodesic active contours. International Journal of Computer Vision 22 (1997) 61-79.

Chan, T.F., Vese, L.A.: Active contours without edges. IEEE Transaction on Image Processing 10 (2001) 266-277.

Osher, S., Sethian, J.A.: Fronts propagating with curvature-dependent speed: algorithms based on hamilton-jacobi formulation. Journal of Computational Physics 79 (1988) 12-49.

Malladi, R., Sethian, J.A., Vemuri, B.C.: Shape modeling with front propagation: a level set approach. IEEE Transaction on Pattern Analysis and Machine Intelligence 17 (1995) 158-175.

Peng, D., Merriman, B., Osher, S., Zhao, H., Kang, M.: A PDE Based Fast Local Level Set Method. Journal of Computational Physics 155 (1999) 410-438.

Li, C., Xu, C., Gui, C., Fox, M.D.: Level set evolution without re-initialization: A new variational forumlation. In: Proc. of IEEE Conference on Computer Vision and Pattern Recognition. vol. 1., San Diego (2005) 430-436.

Shi, Y., Karl, W.C.: Real-time tracking using level sets. In: Proc. of IEEE Conference on Computer Vision and Pattern Recognition. vol. 2., San Diego (2005) 34-41.

Aujol, J.F., Aubert, G.: Signed distance functions and viscosity solutions of discontinuous Hamilton-Jacobi equations. Technical Report RR-4507, INRIA (2002).

Geman, S., Geman, D.: Stochastic relaxation, Gibbs distributions, and the Bayesian restoration of images. IEEE Transactions on Pattern Analysis and Machine Intelligence (1984) 721-741.

Veksler, O.: Efficient Graph-Based Energy Minimization Methods in Computer Vision. PhD thesis, Cornell University (1999).

Boykov, Y., Jolly, M.P.: Interactive organ segmentation using graph cuts. In: Proc. of International Society and Conference Series on Medical Image Computing and Computer-Assisted Intervention. vol. LNCS 1935. (2000) 276-286.

Boykov, Y., Lee, V.S., Rusinek, H., Bansal, R.: Segmentation of dynamic n-d data sets via graph cuts using Markov models. In: Proc. of International Society and Conference Series on Medical Image Computing and Computer-Assisted Intervention. vol. LNCS 2208. (2001) 1058-1066.

Boykov, Y., Jolly, M.P.: Interactive graph cuts for optimal boundary and region segmentation of objects in n-d images. In: 8th IEEE International Conference on Computer Vision. vol. 1. (2001) 105-112.

Boykov, Y., Kolmogorov, V.: An experimental comparison of min-cut/max-flow algorithms for energy minimization in vision. IEEE Transactions on Pattern Analysis and Machine Intelligence 26 (2004) 1124-1137.

Kolmogorov, V., Zabih, R.: What energy functions can be minimized via graph cuts? IEEE Transactions on Pattern Analysis and Machine Intelligence (2004).

Boykov, Y., Veksler, O., Zabih, R.: Efficient approximate energy minimization via graph cuts. IEEE Transactions on Pattern Analysis and Machine Intelligence 20 (2001) 1222-1239.

Barbu, A., Zhu, S.C.: Graph partition by Swendsen-Wang cut. In: Proc. IEEE International Conference on Computer Vision. (2003).

Barbu, A., Zhu, S.C.: Generalizing Swendsen-Wang to sampling arbitrary posterior probabilities. IEEE Transaction on Pattern Analysis and Machine Intelligence 27 (2005).

Tu, Z.: An integrated framework for image segmentation and perceptual grouping. In: Proc. of IEEE International Conference on Computer Vision, Beijing, China (2005).

Paragios, N., Deriche, R.: Geodesic active contours for supervised texture segmentation. In: IEEE Conference on Computer Vision and Pattern Recognition. vol. 1. (1999) 1034-1040.

Zhang, Z., wei He, L.: Whiteboard scanning and image enhancement. Technical Report MSR-TR-03-39, Microsoft Research, Redmond, WA 98502 (2003.

Comaniciu, D., Meer, P.: Mean-shift: A robust approach toward feature space analysis. IEEE Transaction on Pattern Analysis and Machine Intelligence 24 (2002) 1-18.

\* cited by examiner

SEGMENTATION OF OBJECTS BY MINIMIZING GLOBAL-LOCAL VARIATIONAL ENERGY

BACKGROUND

1. Technical Field

The invention is related to image segmentation, and in particular, to a technique for identifying and extracting objects of interest in images through a minimization of global-local energy with respect to a global image data likelihood potential.

2. Related Art

Automatic extraction or segmentation of objects of interest from arbitrary still images as a function of foreground/background separation is a fundamental problem in computer vision. A number of conventional schemes have attempted to address this problem.

For example, one popular approach is to formulate the segmentation problem as an energy minimization problem. This general approach can be roughly categorized into one of two general categories: variational energy minimization, which usually involves solving a partial differential equation (PDE), and graph energy minimization which minimizes an energy functional using conventional graph-cut algorithms.

Image segmentation as a function of variational energy minimization is typically based on the conventional concept of "active contours." In general, the energy functionals of such techniques are usually formulated on region boundary curves and/or over regions partitioned by the boundary curves. Unfortunately, in practice, energy functionals based purely on image gradient information often get stuck in local optima, especially when there are many spurious edges in the image. As a result, image segmentation is either degraded, or fails completely. On the other hand, conventional techniques which use intensity, color and texture distributions of the image pixels over the regions to formulate the energy functional can largely overcome this problem.

Consequently, better energy formulations can be achieved by combining the edge information and the feature distribution of the image pixels. The minimization of this type of variational energy has evolved from the traditional finite difference method (FDM) and the traditional finite element method (FEM) to the more advanced "level-set" methods used in a several conventional image segmentation techniques.

A large amount of work has been done on the implementation of conventional level-set methods to reduce the computation involved during the evolution of the implicit level-set surface so as to increase the efficiency of such techniques. Conventional examples of such techniques include "narrow-band level-set" methods, methods involving level-set without re-initialization, and methods involving fast level-set implementation without the necessity of solving PDEs. In general, each of these more efficient level-set algorithms takes advantage of the property of the signed distance function, which is usually adopted as implicit level-set functions for use in solving the image segmentation problem.

Alternately, formulating the problem of image segmentation as an energy minimization (or a posterior distribution maximization) to be solved by graph cut is justified by the Markov Random Field (MRF) theory. A number of conventional graph-cut image segmentation techniques have been proposed in recent years to provide for object extraction from images.

For example, one such conventional technique involves interactive object extraction. A related technique, referred to as the "iterative Grab-cut system," adopts an efficient min-cut/max-flow algorithm to minimize the energy function. This min-cut/max-flow algorithm is guaranteed to find the global optimal for certain types of energy functions which satisfy the property that they are functions of binary variables, submodular, and can be written as the sum of terms involving at most three variables at a time. For energy functions with multi-label variables, approximate solutions can be obtained by applying conventional algorithms which utilize a sequence of binary moves such as alpha-expansion, alpha-beta swap and k-jumps, etc. Although there are efficient polynomial time algorithms for min-cut/max-flow algorithms, the types of energy functions that can be minimized by these algorithms are generally limited. Examples of more general but less efficient conventional algorithms, which can sample from arbitrary posterior distributions and thus can minimize a more general set of energy functions, include the "Swendsen-Wang cut" and the "generalized m-way Swendsen-Wang cut."

In general, both the variational energy minimization approach and the graph energy minimization approach share the same basic methodology: formulating an objective energy function and solving the resulting optimization problem. The basic differences between the two techniques involve the different optimization strategies adopted by each technique. For example, variational energy minimization based techniques can typically be converted to a PDE and solved by FDM, FEM and level-set, while the graph energy minimization based techniques can be solved by any of a number of min-cut/max-flow algorithms, including the aforementioned Swendsen-Wang cut. The particular type of optimization scheme that is best suited for a particular technique is usually determined by the type of objective function involved. Further, the objective function is also a main factor determining the quality of the segmentation results.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An "Image Segmenter," as described herein, provides a variational energy formulation for segmentation of objects of interest from images. The Image Segmenter provides a "global-local variational energy formulation" for image segmentation. A Gaussian mixture model (GMM) is adopted to capture appearance variation of objects in images. A "global image data likelihood potential" is then computed and combined with local region potentials to obtain a robust and accurate estimation of pixel foreground and background distributions. Iterative minimization of a "global-local energy function" is then accomplished by evolution of a foreground/background boundary curve by level set, and estimation of a foreground/background model by fixed-point iteration, termed "quasi-semi-supervised EM." In general, this quasi-semi-supervised EM is represented by a set of fix-point equations which are designed to deal with the learning problem associated with uncertainly labeled data. Note that as used herein, the term "uncertainly labeled data" refers to the fact that some of the labeled data may have an erroneous label with respect to being designated as either foreground or background.

In particular, the Image Segmenter provides a variational energy formulation for extracting objects of interest from images. This variational energy formulation combines different image cues including gradient, color distribution, and spatial coherence of the image pixels. However, unlike conventional image segmentation techniques, the Image Segmenter incorporates a potential function that represents a global image data likelihood potential (also referred to as "global energy" herein) which is used to provide a global description of all the pixels in the image. Specifically, rather than just fitting image models locally for each subregion on inaccurately labeled image pixels, a global description of the whole image data is achieved as a function of the energy minimization process.

One advantage of using the aforementioned global image data likelihood potential is that during the iterative minimization of the global-local energy function, the Gaussian mixture model (GMM) for each region (e.g. foreground or background regions) is estimated locally from the pixels in the currently estimated region which is in general different from the true region (i.e., the region of the image representing the object of interest to be segmented from the image). In general, the estimated region may contain only a portion of the pixels that belong to the true region. Alternately, the estimated region may contain pixels that do not belong to the true region. The aforementioned variational energy functional is then optimized using a level-set approach in combination with a novel "quasi-semi-supervised expectation-maximization (EM)" algorithm to carry out the optimization for segmenting the objects of interest from the image.

Specifically, the minimization of the aforementioned energy functional involves two steps: the optimization of the objects of interest/background boundary curve by level-set with model distributions fixed; and the robust estimation of the objects of interest/background models by a fixed-point iteration with the boundary curve fixed. The robustness of the model estimation results from incorporating the global image likelihood potential. Furthermore, the fixed-point iteration reveals a robust computational paradigm of model estimation even in the case when some unknown portion of the data is labeled incorrectly. This differs from conventional semi-supervised learning because in semi-supervised learning, the labels are assumed to be correct. This two step optimization is termed "quasi-semi-supervised EM."

In various embodiments, the segmentation process summarized above is further improved by providing general object shape information for use in segmenting and rectifying objects segmented from the image. For example, in a tested embodiment, the Image Segmenter has been adapted to segment, rectify and enhance business cards in arbitrary images. However, it should be noted that the Image Segmenter described herein is sufficiently general that it is capable of segmenting arbitrary objects from images either with or without the use of prior object shape information.

In view of the above summary, it is clear that the Image Segmenter described herein provides a unique system and method for segmenting objects of interest from arbitrary images through iterative minimization of a global-local energy function relative to a Gaussian mixture model iteratively constructed from each image. In addition to the just described benefits, other advantages of the Image Segmenter will become apparent from the detailed description which follows hereinafter when taken in conjunction with the accompanying drawing figures.

DESCRIPTION OF THE DRAWINGS

The file of this patent contains at least one drawing executed in color. Copies of this patent with color drawing(s) will be provided by the Patent and Trademark Office upon request and payment of the necessary fee. The specific features, aspects, and advantages of the present invention will become better understood with regard to the following description, appended claims, and accompanying drawings where:

DETAILED DESCRIPTION

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
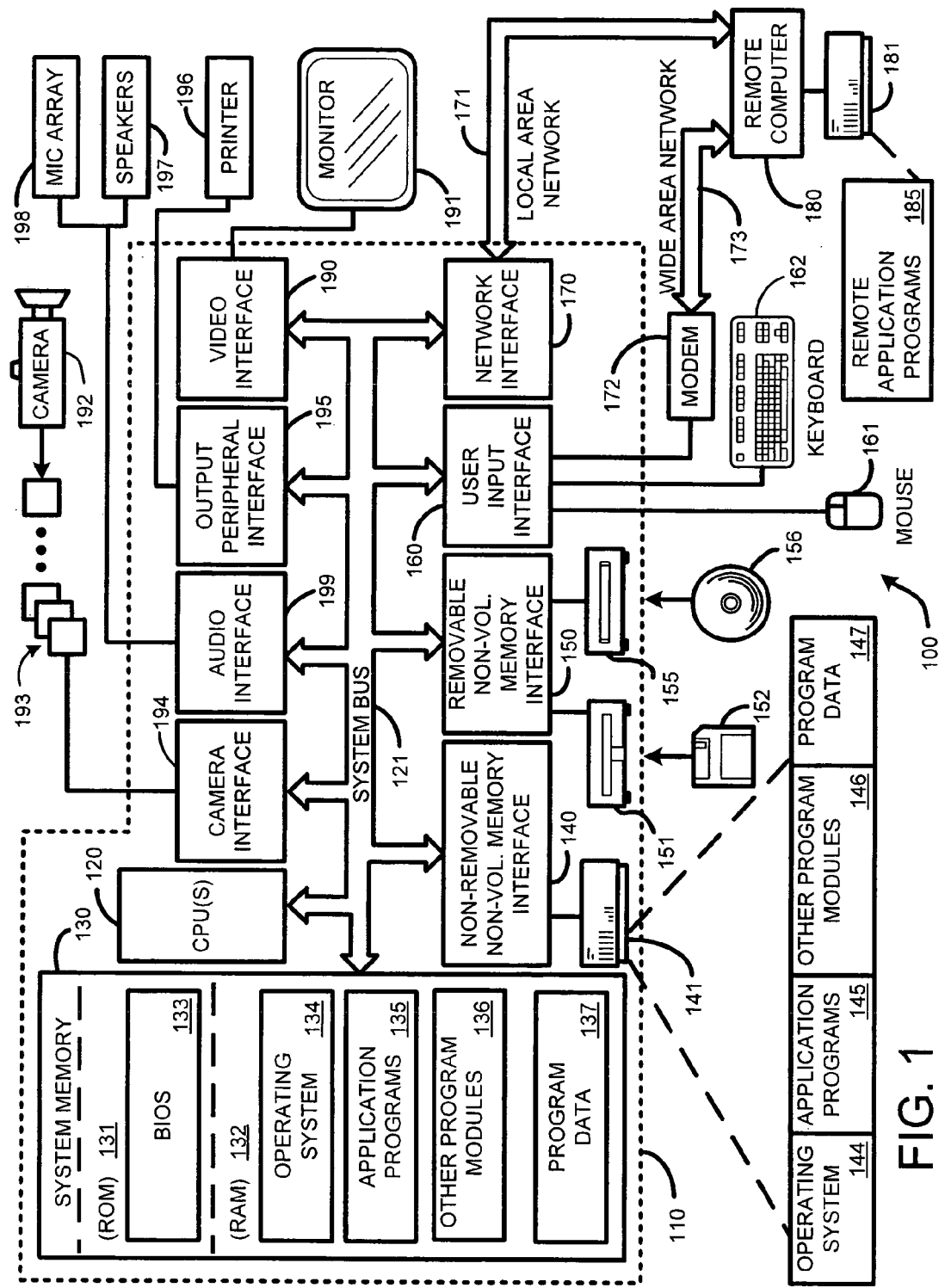
FIG. 1 is a general system diagram depicting a general-purpose computing device constituting an exemplary system for implementing an Image Segmenter, as described herein.

1.0 Exemplary Operating Environments:

FIG. 1 illustrates various examples of a suitable computing environment on which various embodiments and elements of an "Image Segmenter," as described herein, may be implemented.

For example, FIG. 1 illustrates an example of a general computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor 191, computers may also include other peripheral output devices such as a printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras of various types may be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194 using conventional wired or wireless interfaces, including, for example, USB, IEEE 1394, Bluetooth™, IEEE 802.11, etc. This interface is connected to the system bus 121, thereby allowing the images 193 to be routed to and stored in the RAM 132, or any of the other aforementioned data storage devices associated with the computer 110. However, it is noted that previously stored image data can be input into the computer 110 from any of the aforementioned computer-readable media as well, without directly requiring the use of a camera 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environments having now been discussed, the remaining part of this description will be devoted to a discussion of the program modules and processes embodying the "Image Segmenter."

2.0 Introduction:

An "Image Segmenter," as described herein, provides a system and method for segmenting objects of interest from arbitrary images through an iterative minimization of a "global-local energy function" relative to Gaussian mixture models (GMM) and an object boundary curve that are iteratively constructed from each image. This GMM is adopted to capture appearance variation of objects in images via a "global image data likelihood potential" which is computed and combined with local region potentials to obtain a robust and accurate estimation of pixel foreground and background distributions. Iterative minimization of the global-local energy function is then accomplished by evolution of a foreground/background boundary curve by level set, and estimation of a foreground/background model by fixed-point iteration.

Note that the estimation of the foreground/background model by fixed-point iteration is referred to herein as "quasi-semi-supervised expectation-maximization (EM)." In general, this quasi-semi-supervised EM is represented by a set of fix-point equations which are designed to deal with the learning problem associated with uncertainly labeled data. Note also that as used herein, the term "uncertainly labeled data" refers to the fact that some of the labeled data may have an erroneous label with respect to being designated as either foreground or background.

2.1 System Overview:

As noted above, the Image Segmenter described herein provides a system and method for segmenting objects of interest from arbitrary images. In general terms, the Image Segmenter provides a variational energy formulation for extracting objects of interest from images. In various embodiments, this variational energy formulation combines different image cues including gradients, color distribution, and spatial coherence of image pixels. However, unlike conventional image segmentation techniques, the Image Segmenter further incorporates a potential function that represents a global image data likelihood potential which is used to provide a global description of all the pixels in the image. Specifically, rather than just fitting image models locally for each subregion on inaccurately labeled image pixels, a global description of the whole image data is achieved as a function of the energy minimization process.

One advantage of using the aforementioned global image data likelihood potential is that during the iterative minimization of the global-local energy function, the GMM for each region (e.g. foreground or background regions) is estimated locally from the pixels in the currently estimated region. Note that these local estimations are in general different from the true region of interest (i.e., the region of the image representing the object of interest to be segmented from the image). In fact, these estimated regions may contain only a portion of the pixels that belong to the true region. Conversely, the estimated region may contain pixels that do not belong to the true region.

The aforementioned variational energy functional is then optimized using a level-set approach in combination with a novel "quasi-semi-supervised expectation-maximization (EM)" algorithm to carry out the optimization for segmenting the object of interest from the image.

Specifically, the minimization of the aforementioned energy functional involves two iterative steps: 1) the optimization of the object of interest/background boundary curve by level-set using fixed model distributions; and 2) a robust estimation of the object of interest/background models by a fixed-point iteration using a fixed boundary curve. The robustness of the model estimation results from incorporating the global image likelihood potential. Furthermore, the fixed-point iteration reveals a robust computational paradigm of model estimation even in the case when some unknown portion of the data is incorrectly labeled (i.e. foreground vs. background labeling). This differs from conventional semi-supervised learning techniques because in semi-supervised learning, the labels are assumed to be correct. This two step optimization is termed "quasi-semi-supervised EM." Note that as described in further detail in Section 3, the iteration of the aforementioned steps generally continues until convergence has been achieved, or until a maximum number of iterations have been performed.

In various embodiments, the segmentation process summarized above is further improved by providing general object shape information for use in segmenting and rectifying objects segmented from the image. For example, in a tested embodiment, the Image Segmenter has been adapted to segment, rectify and enhance business cards in arbitrary images. However, it should be noted that the Image Segmenter described herein is sufficiently general that it is capable of segmenting arbitrary objects from images either with or without the use of prior knowledge of object shape information.

Figure 2:
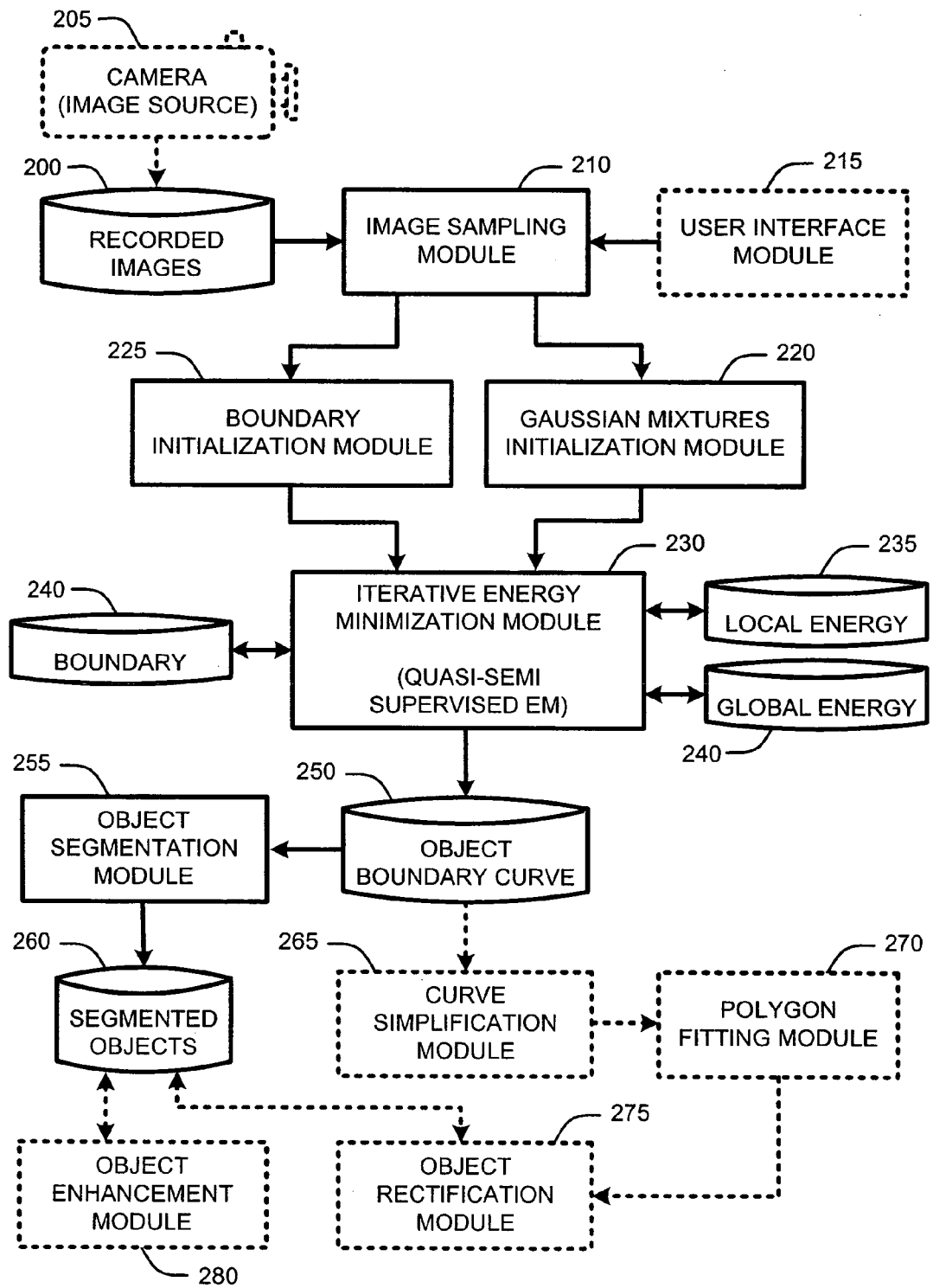
FIG. 2 illustrates an exemplary architectural system diagram showing exemplary program modules for implementing the Image Segmenter.

2.2 System Architectural Overview:

The processes summarized above are illustrated by the general system diagram of FIG. 2. In particular, the system diagram of FIG. 2 illustrates the interrelationships between program modules for implementing the Image Segmenter, as described herein. It should be noted that any boxes and interconnections between boxes that are represented by broken or dashed lines in FIG. 2 represent alternate embodiments of the Image Segmenter described herein, and that any or all of these alternate embodiments, as described below, may be used in combination with other alternate embodiments that are described throughout this document.

In general, as illustrated by FIG. 2, the Image Segmenter generally begins operation by providing a recorded image 200, which may be captured via a digital camera 205, or the like, to an image sampling module 210. The image sampling module 210 then samples particular regions the input image 200 and provides those samples to a Gaussian mixtures initialization module 220, and a boundary initialization module 225. Note that in one embodiment, a user interface module 215 interfaces with the image sampling module 210 to allow a user to manually specify a region of the input image 200 which contains the object of interest to be extracted from the image.

In general, as described in further detail in Section 3 and Section 4, the image sampling module 210 provides samples from a plurality of regions along the outer border of the input image 200, and samples from a region at the center of the image assumed to contain some portion of the object of interest. Alternately, rather than returning samples from the center of the input image 200, the image sampling module 210 may instead return samples from within the user specified region of the input image. The image sampling module 210 also provides samples of the entire input image 200 for use by the Gaussian mixtures initialization module 220 in constructing a global image data likelihood potential as described in further detail below.

The Gaussian mixtures initialization module 220 then uses the samples returned from the image sampling module 210 to initialize a Gaussian mixture model representing a foreground region of the input image 200 (based on the samples from center or user selected region of the input image). In addition, the Gaussian mixtures initialization module 220 uses the samples returned from along the outer border of the input image 200 to initialize a Gaussian mixture model representing a background region of the input image. Collectively, the foreground and background mixture models are referred to as a "local energy" 235. Finally, as noted above, the Gaussian mixtures initialization module 220 also generates a global image data likelihood potential (also referred to as a "global energy" 240) which provides a global description of all the pixels in the input image 200.

The boundary initialization module 225 operates to generate an initial boundary curve for the object of interest by selecting initially defining a boundary surrounding the sampled region of the image center, or a boundary surrounding the user selected region, if applicable.

Next, as described in further detail in Section 3.3, and specifically in Section 3.3.4 with respect to Equation 8, an iterative energy module 230 performs an iterative energy minimization operation, termed "quasi-semi supervised expectation maximization" to iteratively optimize the foreground and background regions and the boundary curve as a joint function of the boundary curve, the local energy potential (foreground and background regions) and the global energy potential. As a result of the iterative joint minimization of the energy functional, a final boundary curve 250 representing the object of interest to be segmented from the image is produced.

This final boundary curve 250 is then provided to an object segmentation module 255 which uses conventional techniques to extract the image pixels from within the boundary curve 250 to provide a segmented object 260 for use as desired.

In a related embodiment, the boundary curve 250 is used to provide further processing of the object of interest. For example, as described in further detail in Section 4, a curve simplification module 265 operates on the boundary curve 250 to reduce the number of vertices comprising the boundary curve of planar objects (such as business cards, for example) having the shape of a known or arbitrary regular polygon. A polygon fitting module 270 then operates on the reduced set of vertices provided via the curve simplification module 265 to identify and fit an optimal polygon to the boundaries of the object of interest. Note that this polygon fitting is also capable of addressing some occlusion of the object of interest, as described in further detail in Section 4. Finally, given the optimal polygon fitted to the object of interest, an object rectification module 275 estimates the actual polygon aspect and operates to rectify the segmented object 260.

In yet another embodiment, segmented objects 260 are further processed by an object enhancement module 280 to enhance the visual appearance of the segmented objects. For example, in the case where a business card is extracted from an input image 200, the object enhancement module 280 can operate to enhance the readability of any text on the business card through the use of conventional image processing techniques. Note that the image enhancement module 280 may also operate on segmented objects that have been rectified by the object rectification module 275.

3.0 Operation Overview:

The above-described program modules are employed for implementing the Image Segmenter described herein. As summarized above, this Image Segmenter provides a system and method for segmenting objects of interest from arbitrary images. The following sections provide a detailed discussion of the operation of the Image Segmenter, and of exemplary methods for implementing the program modules described in Section 2.

3.1 Operational Details of the Image Segmenter:

The following paragraphs detail specific operational embodiments of the Image Segmenter described herein. In particular, the following paragraphs describe general assumptions regarding input images, the overall variational formulation of the image segmentation problem; and the iterative joint minimization of the local and global energy functionals with respect to the boundary curve of the object of interest.

3.2 Input Images:

As noted above, the Image Segmenter processes arbitrary images to extract objects of interest from those images. These images may be pre-recorded, or provided via an analog or digital camera, or from a video stream feed which is capable of being interfaced with an external computing device, and by extension to the Image Segmenter.

One basic assumption made with respect to the input images is that when people capture an image of an object of interest, they will usually locate some portion of the object at or near the center of the image. While not critical to successful segmentation of object of interest from arbitrary images, the assumption of a roughly centered object of interest serves to greatly facilitate initialization of the boundary curve processing described herein, and thus by extension, the overall iterative minimization of the global-local energy function. Note that in a related embodiment, boundary curve processing is initialized by allowing manual user selection of a point or region within the overall image that contains some portion of the object of interest.

3.3 Variational Formulation of the Image Segmentation Problem:

The following paragraphs describe the initialization and joint minimization of the local and global energy functionals with respect to the joint evolution of the boundary curve of the object of interest.

3.3.1 Local Region Potential:

For image segmentation, one important issue is to define the "homogeneity" of the different image regions, since this homogeneity directly determines how the pixels will be grouped together to form the region. It is natural to model the homogeneity of an image region using a probabilistic distribution. For example, some conventional techniques have adopted a Gaussian distribution on the pixel intensity, while other conventional techniques have adopted a learned Gaussian mixture model (GMM) for texture regions to model homogenous image regions.

However, unlike these conventional techniques, because the Image Segmenter operates to extract the foreground object from the background, it can not be assumed that pixels inside either the foreground region or the background region form a single mode Gaussian distribution. Consequently, the Image Segmenter acts to separately model the color distributions of both the foreground and the background regions as separate Gaussian mixtures.

Generally, the foreground image is denoted as F, the background image is denoted as B, and the image data I=F∪B, where u(x,y) is the feature vector at image coordinate (x,y). This concept is illustrated by the Gaussian mixtures of Equation 1A (foreground region mixture model) and Equation 1B (background region mixture model), as follows:

$$P_F(u(x,y)) = P\left(u(x,y) | (x,y) \in F\right) = \sum_{i=1}^{K_F} \pi_i^F N(u(x,y) | \mu_i^F, \Sigma_i^F) \quad \text{Eqn. 1A}$$

$$P_B(u(x,y)) = P\left(u(x,y) | (x,y) \in B\right) = \sum_{i=1}^{K_B} \pi_i^B N(u(x,y) | \mu_i^B, \Sigma_i^B) \quad \text{Eqn. 1B}$$

where $\pi_i$, $\mu_i$ and $\Sigma_i$ are the mixture weight, the mean and the covariance of the corresponding Gaussian components, and $K_F$ and $K_B$ represent the number of Gaussian components in each of the Gaussian mixture models.

Assuming that the image pixels are drawn i.i.d. from these two Gaussian mixtures, then the image data likelihood is just a mixture model of the foreground and background distribution as illustrated by Equation 2:

$$P_1(u(x,y)) = \omega_F P_F(u(x,y)) + \omega_B P_B(u(x,y)), \text{ s.t., } \omega_F + \omega_B = 1 \quad \text{Eqn. 2}$$

where $\omega_F = P((x,y) \in F)$ and $\omega_B = P((x,y) \in B)$ are the a priori probabilities of a pixel being drawn from either the foreground or background, respectively.

The estimation of foreground and background regions is then denoted as $A_F$ and $A_B$, where the image data $I = A_F \cup A_B$. Then the quality of the estimation is evaluated by the joint likelihood probabilities of foreground and background pixels as illustrated by Equation 3:

$$E_{hl} = \prod_{(x,y) \in A_F} P(u(x,y), (x,y) \in F) \prod_{(x,y) \in A_B} P(u(x,y), (x,y) \in B) \quad \text{Eqn. 3}$$

$$= \prod_{(x,y) \in A_F} \omega_F P_F(u(x,y)) \prod_{(x,y) \in A_B} \omega_B P_B(u(x,y))$$

Then, taking the log on both sides of Equation 3, the region likelihood potential energy $E_h$ is given by Equation 4:

$$E_h = \int_{(x,y) \in A_F} \{\log P_F(u(x,y)) + \log \omega_F\} + \int_{(x,y) \in A_B} \{\log P_B(u(x,y)) + \log \omega_B\} \quad \text{Eqn. 4}$$

Note that the local region potential energy $E_h$ illustrated Equation 4 is more general than then conventional energy functions since unlike conventional techniques, it has incorporated the prior probabilities of both the foreground and background. In the case where there is no a priori knowledge regarding the foreground/background distribution, i.e., $\omega_F = \omega_B = \frac{1}{2}$ the region potential in Equation 4 is the just the same with them.

Clearly, better segmentation results, $A_F$ and $A_B$, are achieved with higher values of $E_h$ and $E_{hl}$. However, the maximization of $E_h$ with respect the regions $A_F$ and $A_B$ and the probability distribution is a chicken-and-egg problem, i.e., if $\omega_F$, $\omega_B$, $P_F$ and $P_B$ are known, then an optimal $A_F$ and $A_B$ are easy to identify, and vice versa.

3.3.2 Global Image Data Likelihood Potential:

Equation 4 independently evaluates the fitness of the estimated foreground and background region. However, by itself, it is not enough for an unsupervised or semi-supervised foreground/background segmentation problem, since $\omega_F$, $\omega_B$, $P_F$ and $P_B$ must also be estimated during the segmentation process. Note that the terms $\omega_F$, $\omega_B$, $P_F$ and $P_B$ represent the image data likelihood model $P_1(u(x,y))$. Since the image pixels can be regarded as i.i.d. samples drawn from $P_1(u(x,y))$, then the optimal estimation of $P_1(u(x,y))$ must maximize the joint image data likelihood, $E_{ll}$, as illustrated by Equation 5:

$$E_{ll} = \prod_{(x,y) \in A_F \cup A_B} P_l(u(x,y)) \quad \text{Eqn. 5}$$

$$= \prod_{(x,y) \in I} \omega_F P_F(u(x,y)) + \omega_B P_B(u(x,y))$$

Then, taking the log on the joint likelihood, the image data likelihood potential is provided by Equation 6, as follows:

$$E_l = \int_{(x,y) \in I} \log P_l(u(x,y)) \qquad \text{Eqn. 6}$$
$$= \int_{(x,y) \in I} \log\{\omega_F P_F(u(x,y)) + \omega_B P_B(u(x,y))\}$$

3.3.3 Boundary Potential:

Edges identified within images provide strong cues for segmentation. In other words, the segmentation itself refers to finding the boundary edges to group the image pixels to be associated with different semantic meaning. The Image Segmenter formulates the edge identification problem as a variational energy minimization problem to obtain an optimal boundary $\Gamma(c)$: $c \in [0,1] \to (x,y) \in R^2$ which is a closed curve between the region $A_F$ and the region $A_B$ such that $\Gamma(c) = A_F \cap A_B$, by minimizing $$E_e(\Gamma(c)) = \int_0^1 \frac{1}{1 + |g_x(\Gamma(c))| + |g_y(\Gamma(c))|} |\dot{\Gamma}(c)| dc \qquad \text{Eqn. 7}$$
$$= \int_0^1 G(\Gamma(c)) |\dot{\Gamma}(c)| dc$$

where $g_x$ and $g_y$ are the image gradient at the image coordinate (x,y) in the horizontal and vertical directions, respectively, and $\dot{\Gamma}(c)$ is the first order derivative of the boundary curve. Minimizing $E_e(\Gamma(c))$ will align the boundary curve $\Gamma(c)$ to the image pixel with the maximum image gradient while $\dot{\Gamma}(c)$ will impose the constraint that the boundary curve be as smooth as possible.

3.3.4 Boundary, Region and Data Likelihood Synergism:

Unlike conventional image segmentation techniques which use variational energy minimization, the Image Segmenter combines the boundary information $E_e$, the region information and the data likelihood information for reliable image segmentation while incorporating both the local and global potential energy, $E_h$ and $E_l$ as illustrated by Equation 8, where:

$$E_p(\Gamma(c), P_l) = \alpha E_e - \beta E_h - \gamma E_l \qquad \text{Eqn. 8}$$

$$= \alpha \underbrace{\int_0^1 \frac{1}{1 + |g_x(\Gamma(c))| + |g_y(\Gamma(c))|} |\dot{\Gamma}(c)| dc}_{E_e} -$$

$$\underbrace{\beta \left( \int_{A_F} \{\log P_F(u) + \log \omega_F\} + \int_{A_B} \{\log P_B(u) + \log \omega_B\} \right)}_{E_h} -$$

$$\underbrace{\gamma \int_{A_F \cup A_B} \log\{\omega_F P_F(u) + \omega_B P_B(u)\}}_{E_l}$$

where $\alpha$, $\beta$ and $\gamma$ are positive numbers such that $\alpha + \beta + \gamma = 1$, which are set for better balancing of these energies (as described in further detail in Section 3.4).

3.4 Iterative Minimization:

Since there is no pre-specified image data model $P_1(u)$, i.e., the foreground distribution $P_F(u)$, background distribution $P_B(u)$, and the mixture weights $\omega_F$ and $\omega_B$. It should be obvious that the variational energy functional provided by Equation 8 relies on two sets of functions, i.e., the boundary curve $\Gamma(c)$, and the image data model $P_1(u)$. Therefore, a two step iterative process is used to minimize the energy functional. In particular, in one step of this two step process, the energy is minimized with respect to the boundary curve $\Gamma(c)$ while holding the image data model $P_1(u)$ fixed. In the other step of this two step process, the energy functional is minimized with respect to $P_1(u)$ while holding the boundary $\Gamma(c)$ fixed. Each of these steps is guaranteed to minimize the variational energy, as described in further detail below.

3.4.1 Boundary Optimization by Level Set:

In the first step of the aforementioned iterative minimization process, $P_F(u)$, $P_B(u)$, $\omega_F$ and $\omega_B$, are fixed, and the energy functional is then minimized with respect to the boundary curve $\Gamma(c)$. This minimization is achieved by gradient decent, e.g., taking the variation of $E_p(\Gamma(c), P_F, P_B)$ with respect to $\Gamma(c)$, gives:

$$\frac{\partial E_p}{\partial \Gamma(c)} = \beta \log \left[ \frac{\omega_F P_F(u(\Gamma(c)))}{\omega_B P_B(u(\Gamma(c)))} \right] \cdot n(\Gamma(c)) + \qquad \text{Eqn. 9}$$
$$\alpha [G(\Gamma(c)) K(\Gamma(c)) - \nabla G(\Gamma(c)) \cdot n(\Gamma(c))] \cdot n(\Gamma(c)),$$

where n(•) represents the normal line pointing outwards from the boundary curve $\Gamma(c)$ and all the function values should be evaluated on each point of the boundary curve $\Gamma(c)$. One interesting observation here is that given the form of the partial variation in Equation 9, the image data likelihood potential $E_l$ does not affect the partial variation of the energy functional with respect to the boundary curve. This is easy to understand because the $E_l$ is evaluated on the whole image. Consequently, it does not rely on the boundary curve $\Gamma(c)$.

Level set is used to evaluate the above partial derivative equations. In particular, at each time instant t during the optimization of the curve, $\Gamma(c,t)$ is represented as the zero level set of a 2-Dimensional function or surface $\phi(x,y,t)$, i.e., $\Gamma(c,t) := \{(x,y) | \phi(x,y,t) = 0\}$, where $\phi(x,y,t)$ is defined as a signed distance function, i.e., $$\varphi(x, y, t) = \begin{cases} d((x,y), \Gamma(c,t)), & (x,y) \in A_F \setminus \Gamma(c,t) \\ 0, & (x,y) \in \Gamma(c,t) \\ -d((x,y), \Gamma(c,t)) & (x,y) \in A_B \setminus \Gamma(c,t) \end{cases} \qquad \text{Eqn. 10}$$

where d(•) is the Euclidean distance from the point (x,y) to $\Gamma(c,t)$ which is defined as the shortest possible distance from (x,y) to any points in $\Gamma(c,t)$. This then results in the formulation of Equation 11, as follows:

$$\frac{\partial \varphi(x,y,t)}{\partial t} = \beta \log \left[ \frac{\omega_F P_F(u(x,y))}{\omega_B P_B(u(x,y))} \right] |\nabla \varphi(\cdot)| + \qquad \text{Eqn. 11}$$
$$\alpha \left[ G(x,y) K(x,y) - \nabla G(x,y) \cdot \frac{\nabla \varphi(\cdot)}{|\nabla \varphi(\cdot)|} \right] \cdot |\nabla \varphi(\cdot)|$$

where

-continued $$K(x, y) = \frac{\varphi_{xx}\varphi_y^2 - 2\varphi_{xy}\varphi_x\varphi_y + \varphi_{yy}\varphi_x^2}{(\varphi_x^2 + \varphi_y^2)^{\frac{3}{2}}},$$ Eqn. 12 among which $\phi_x$ and $\phi_y$, and $\phi_{xx}$, $\phi_{yy}$ and $\phi_{xy}$ are the set of first order partial derivatives and the set of second order of partial derivatives of $\phi(x,y,t)$, respectively.

The evolution of $\phi(x,y,t)$ over time t is implemented by replacing the derivatives by discrete differences, i.e., the partial derivative with respect to t is approximated by forward differences and the partial derivative with respect to x and y are approximated by central differences. In principle, the evolution of the surface is evaluated as illustrated by Equation 13, where:

$$\varphi(x, y, t+\tau) =$$ Eqn. 13

$$\varphi(x, y, t) + \tau \cdot \left\{ \begin{array}{l} \beta \log\left[\frac{\omega_F P_F(u(x,y))}{\omega_B P_B(u(x,y))}\right] |\nabla\varphi(\cdot)| + \alpha \\ \left[G(x,y)K(x,y) - \nabla G(x,y) \cdot \frac{\nabla\varphi(\cdot)}{|\nabla\varphi(\cdot)|}\right] \cdot |\nabla\varphi(\cdot)| \end{array} \right\},$$

where $\tau$ is the discrete time step, and $\Gamma(c,t+\tau)=\{(x,y)|\phi(x,y,t+\tau)=0\}$.

3.4.2 Image Data Model Estimation

As noted above, in the second step of the aforementioned iterative minimization process, the boundary curve $\Gamma(c)$ is fixed and the energy functional is minimized with respect to $P_F(u)$, $P_B(u)$, $\omega_F$ and $\omega_B$ at the same time. In other words, by fixing $A_F$ and $A_B$, the energy functional is minimized with respect to $P_1(u)$. In principle, this involves minimizing the variational energy with respect to all the parameters $\Theta$ of $P_1(u)$, i.e., $$\Theta = \left\{ \omega_F, \omega_B, \left\{\pi_i^F, \mu_i^F, \sum_i^F\right\}_{i=1}^{K_F}, \left\{\pi_i^B, \mu_i^B, \sum_i^B\right\}_{i=1}^{K_B} \right\}$$ Eqn. 14

Then, taking the derivative of the variational energy $E_p$ with respect to each of the individual parameters in $\Theta$ results in the following set of equations:

$$\frac{\partial E_p}{\partial \omega_F} = \beta \int_{A_F} \frac{1}{\omega_F} + \gamma \int_I \frac{P_F(u)}{\omega_F P_F(u) + \omega_B P_B(u)}$$ Eqn. 15

$$\frac{\partial E_p}{\partial \omega_B} = \beta \int_{A_B} \frac{1}{\omega_B} + \gamma \int_I \frac{P_B(u)}{\omega_F P_F(u) + \omega_B P_B(u)}$$ Eqn. 16

$$\frac{\partial E_p}{\partial \pi_i^F} = \beta \int_{A_F} \frac{\omega_F N\left(u|\mu_i^F, \sum_i^F\right)}{\omega_F P_F(u)} + \gamma \int_I \frac{\omega_F N\left(u|\mu_i^F, \sum_i^F\right)}{\omega_F P_F(u) + \omega_B P_B(u)}$$ Eqn. 17

$$\frac{\partial E_p}{\partial \mu_i^F} = \beta \int_{A_F} \frac{\omega_F \pi_i^F N\left(u|\mu_i^F, \sum_i^F\right)\left(\sum_i^F\right)^{-1}(u-\mu_i^F)}{\omega_F P_F(u)} +$$ Eqn. 18

$$\gamma \int_I \frac{\omega_F \pi_i^F N\left(u|\mu_i^F, \sum_i^F\right)\left(\sum_i^F\right)^{-1}(u-\mu_i^F)}{\omega_F P_F(u) + \omega_B P_B(u)}$$

$$\frac{\partial E_p}{\partial \sum_i^F} = \beta \int_{A_F} \frac{\left[\begin{array}{c}\omega_F \pi_i^F N\left(u|\mu_i^F, \sum_i^F\right)\\(u-\mu_i^F)(u-\mu_i^F)^T\left(\sum_i^F\right)^{-1} - I\end{array}\right]}{2\omega_F P_F(u)} +$$ Eqn. 19

$$\gamma \int_I \frac{\left[\begin{array}{c}\omega_F \pi_i^F N\left(u|\mu_i^F, \sum_i^F\right)\\(u-\mu_i^F)(u-\mu_i^F)^T\left(\sum_i^F\right)^{-1} - I\end{array}\right]}{2[\omega_F P_F(u) + \omega_B P_B(u)]}$$

$$\frac{\partial E_p}{\partial \pi_i^B} = \beta \int_{A_B} \frac{\omega_B N\left(u|\vec{\mu}_i^B, \sum_i^B\right)}{\omega_B P_B(u)} + \gamma \int_I \frac{\omega_B N\left(u|\vec{\mu}_i^B, \sum_i^B\right)}{\omega_F P_F(u) + \omega_B P_B(u)}$$ Eqn. 20

$$\frac{\partial E_p}{\partial \mu_i^B} = \beta \int_{A_B} \frac{\omega_B \pi_i^B N\left(u|\mu_i^B, \sum_i^B\right)\left(\sum_i^B\right)^{-1}(u-\mu)}{\omega_B P_B(u)} +$$ Eqn. 21

$$\gamma \int_{A_B \cup A_B} \frac{\omega_B \pi_i^B N\left(u|\mu_i^B, \sum_i^B\right)\left(\sum_i^B\right)^{-1}(u-\mu)}{\omega_F P_F(u) + \omega_B P_B(u)}$$

$$\frac{\partial E_p}{\partial \sum_i^B} = \beta \int_{A_B} \frac{\left[\begin{array}{c}\omega_B \pi_i^B N\left(u|\mu_i^B, \sum_i^B\right)\\(u-\mu)(u-\mu)^T\left(\sum_i^B\right)^{-1} - I\end{array}\right]}{2\omega_B P_B(u)} +$$ Eqn. 22

$$\gamma \int_I \frac{\left[\begin{array}{c}\omega_B \pi_i^B N\left(u|\mu_i^B, \sum_i^B\right)\\(u-\mu)(u-\mu)^T\left(\sum_i^B\right)^{-1} - I\end{array}\right]}{2[\omega_F P_F(u) + \omega_B P_B(u)]}$$

where I is the identity matrix.

Finally, setting all the derivatives to zero results in the following set of fix-point equations:

$$\omega_F^* = \frac{\beta \int_{A_F} 1 + \gamma \int_I \frac{2\omega_F P_F(u)}{\omega_F P_F(u) + \omega_B P_B(u)}}{\gamma \int_I \frac{P_F(u)}{\omega_F P_F(u) + \omega_B P_B(u)}} \quad \text{Eqn. 23}$$

$$\omega_B^* = \frac{\beta \int_{A_B} 1 + \gamma \int_I \frac{2\omega_B P_B(u)}{\omega_F P_F(u) + \omega_B P_B(u)}}{\gamma \int_I \frac{P_B(u)}{\omega_F P_F(u) + \omega_B P_B(u)}} \quad \text{Eqn. 24}$$

$$\pi_i^{F*} = \frac{\beta \int_{A_F} \frac{\pi_i^F N\left(u|\mu_i^F, \sum_i^F\right)}{\omega_F P_F(u)}}{\beta \int_{A_F} \frac{2N\left(u|\mu_i^F, \sum_i^F\right)}{\omega_F P_F(u)} + \gamma \int_I \frac{N\left(u|\mu_i^F, \sum_i^F\right)}{\omega_F P_F(u) + \omega_B P_B(u)}} \quad \text{Eqn. 25}$$

$$\mu_i^{F*} = \frac{\beta \int_{A_F} \frac{uN\left(u|\mu_i^F, \sum_i^F\right)}{\omega_F P_F(u)} + \gamma \int_I \frac{uN\left(u|\mu_i^F, \sum_i^F\right)}{\omega_F P_F(u) + \omega_B P_B(u)}}{\beta \int_{A_F} \frac{N\left(u|\mu_i^F, \sum_i^F\right)}{\omega_F P_F(u)} + \gamma \int_I \frac{N\left(u|\mu_i^F, \sum_i^F\right)}{\omega_F P_F(u) + \omega_B P_B(u)}} \quad \text{Eqn. 26}$$

$$\sum_i^{F*} = \frac{\beta \int_{A_F} \frac{(u-\mu_i^F)(u-\mu_i^F)^T N\left(u|\mu_i^F, \sum_i^F\right)}{\omega_F P_F(u)} + \gamma \int_I \frac{(u-\mu_i^F)(u-\mu_i^F)^T N\left(u|\mu_i^F, \sum_i^F\right)}{\omega_F P_F(u) + \omega_B P_B(u)}}{\beta \int_{A_F} \frac{N\left(u|\mu_i^F, \sum_i^F\right)}{\omega_F P_F(u)} + \gamma \int_I \frac{N\left(u|\mu_i^F, \sum_i^F\right)}{\omega_F P_F(u) + \omega_B P_B(u)}} \quad \text{Eqn. 27}$$

$$\pi_i^{B*} = \frac{\beta \int_{A_B} \frac{\pi_i^B N\left(u|\mu_i^B, \sum_i^B\right)}{\omega_B P_B(u)}}{\beta \int_{A_B} \frac{2N\left(u|\mu_i^B, \sum_i^B\right)}{\omega_B P_B(u)} + \gamma \int_I \frac{N\left(u|\mu_i^B, \sum_i^B\right)}{\omega_F P_F(u) + \omega_B P_B(u)}} \quad \text{Eqn. 28}$$

$$\mu_i^{B*} = \frac{\beta \int_{A_B} \frac{uN\left(u|\mu_i^B, \sum_i^B\right)}{\omega_B P_B(u)} + \gamma \int_I \frac{uN\left(u|\mu_i^B, \sum_i^B\right)}{\omega_F P_F(u) + \omega_B P_B(u)}}{\beta \int_{A_B} \frac{N\left(u|\mu_i^B, \sum_i^B\right)}{\omega_B P_B(u)} + \gamma \int_I \frac{N\left(u|\mu_i^B, \sum_i^B\right)}{\omega_F P_F(u) + \omega_B P_B(u)}} \quad \text{Eqn. 29}$$

$$\sum_i^{B*} = \frac{\beta \int_{A_B} \frac{(u-\mu_i^B)(u-\mu_i^B)^T N\left(u|\mu_i^B, \sum_i^B\right)}{\omega_B P_B(u)} + \gamma \int_I \frac{(u-\mu_i^B)(u-\mu_i^B)^T N\left(u|\mu_i^B, \sum_i^B\right)}{\omega_F P_F(u) + \omega_B P_B(u)}}{\beta \int_{A_B} \frac{N\left(u|\mu_i^B, \sum_i^B\right)}{\omega_B P_B(u)} + \gamma \int_I \frac{N\left(u|\mu_i^B, \sum_i^B\right)}{\omega_F P_F(u) + \omega_B P_B(u)}} \quad \text{Eqn. 30}$$

Equations 23-30 are also subject to the constraints that:

$$\omega_F^* + \omega_B^* = 1, \sum_{i=1}^{K_F} \pi_i^F = 1, \sum_{i=1}^{K_B} \pi_i^B = 1. \quad \text{Eqn. 31}$$

Therefore, it is necessary to normalize these weights at each iteration of the fix-point iterations.

The set of fix-point equations illustrated by Equations 23 through 30 can be interpreted as a robust "quasi-semi-supervised EM" algorithm. As defined herein, the term "quasi-semi-supervised" means that there is inaccurate labeling of the data in a 2-class classification problem (foreground and background), and each class can be represented by a Gaussian mixture model. It turns out that the robust estimation of the data distribution, and thus the probabilistic distribution for each of the classes can be achieved by a fix-point iteration similar to that illustrated by Equations 23 through 30.

Here the foreground and background image pixels are the two classes than are to be discriminated, and $A_F$ and $A_B$ are regarded as the inaccurate labeling of the foreground and background pixels. The fix-point equations derived above operate to achieve a balance between the estimation from the labeled data and the unsupervised estimation, with the erroneously labeled data being given less weight during the fix-point iteration. This process can be observed in Equation 26, where the first integration of the numerator over $A_F$ is in fact the estimation from the inaccurately labeled data, and the second integration of the numerator over $I = A_F \cup A_B$ is a soft classification of the image pixels by the current estimation of the data likelihood model. Further, those image pixels which have been labeled to be in $A_F$, and which have also been classified with high confidence as foreground pixels will be given more weight. This will result in a more robust estimation of the data distribution since the effects of any erroneously labeled data will be suppressed.

4.0 Real-World Examples of Object Segmentation from Images:

Although the formulation of the segmentation techniques described above are sufficiently generalized to handle image segmentation in an arbitrary setting, the Image Segmenter can be further optimized for specific applications, i.e., the segmentation of objects having the focus of attention in the image. In particular, as noted above, a basic assumption can be made when initializing the evolution of the boundary curve computations that people typically tend to capture images wherein the object of interest is located at or near the center of the image. This assumption facilitates image segmentation computations through a better initialization the boundary curve computations.

For example, as described below, the performance of segmentation of objects such as business cards in arbitrary images is improved by assuming: 1) the business card is located near the center of the image; and 2) the business card is approximately rectangular (but will likely appear as a quadrangle shape in the image as a result of the orientation of the camera and/or the orientation of the business card within the image).

4.1 Automatic Extraction of Business Cards from Images:

Given the image segmentation techniques described above, it is a simple matter to segment business cards from arbitrary images. Further, once extracted from such images, in one embodiment, the shape of the business card (likely a quadrangle in the image) is then rectified to be a rectangle with the correct physical aspect ratio. In addition, in another embodiment, this rectified image is enhanced to improve readability of the card. For example, such enhancement may include enhancing the contrast of the rectified image by transforming it through a "S" shaped Hermite curve interpolated according the intensity distribution of the image pixels, applying unsharp masks, performing optical character recognition on the text of the business card, etc.

In general, segmentation of objects such as business cards includes three sub-systems, namely: 1) the segmentation subsystem; 2) the shape rectification subsystem; and 3) the image enhancement subsystem. Each of these subsystems is described below in the context of segmenting business cards from arbitrary images. However, it should be appreciated by those skilled in the art that the techniques described below with respect to business card segmentation may be applied to other types of objects of any shape.

4.1.1 Business Card Segmentation:

The segmentation of business cards from arbitrary images is achieved using the techniques described herein. The output of the segmentation subsystem is a clock-wise chain code of the image coordinates for the closed boundary of the business card region identified, along with labeling whether each pixel belongs to the business card (i.e., the foreground area $A_F$) or the background area $A_B$.

For example, given an arbitrary color input image, an image feature vector u is defined as a five dimensional vector $\{L,U,V,x,y\}$, where L, U and V are the color pixel values in the LUV color space, and x and y are the coordinates of the pixels in the image. Note that while use of the LUV color space is not essential to operation of the Image Segmenter, use of the LUV color space facilitates meaningful segmentation since the perceived color difference in the LUV space is very coherent as a Euclidean metric.

The foreground object model $P_F$ is a 2-component mixture of Gaussians, which models the bright sheet and dark characters of most business cards. Assuming a color image, the background model $P_B$ is an 8-component mixture of Gaussians, which should cover most of the pixels located in the boundary of the image coordinate.

Figure 3:
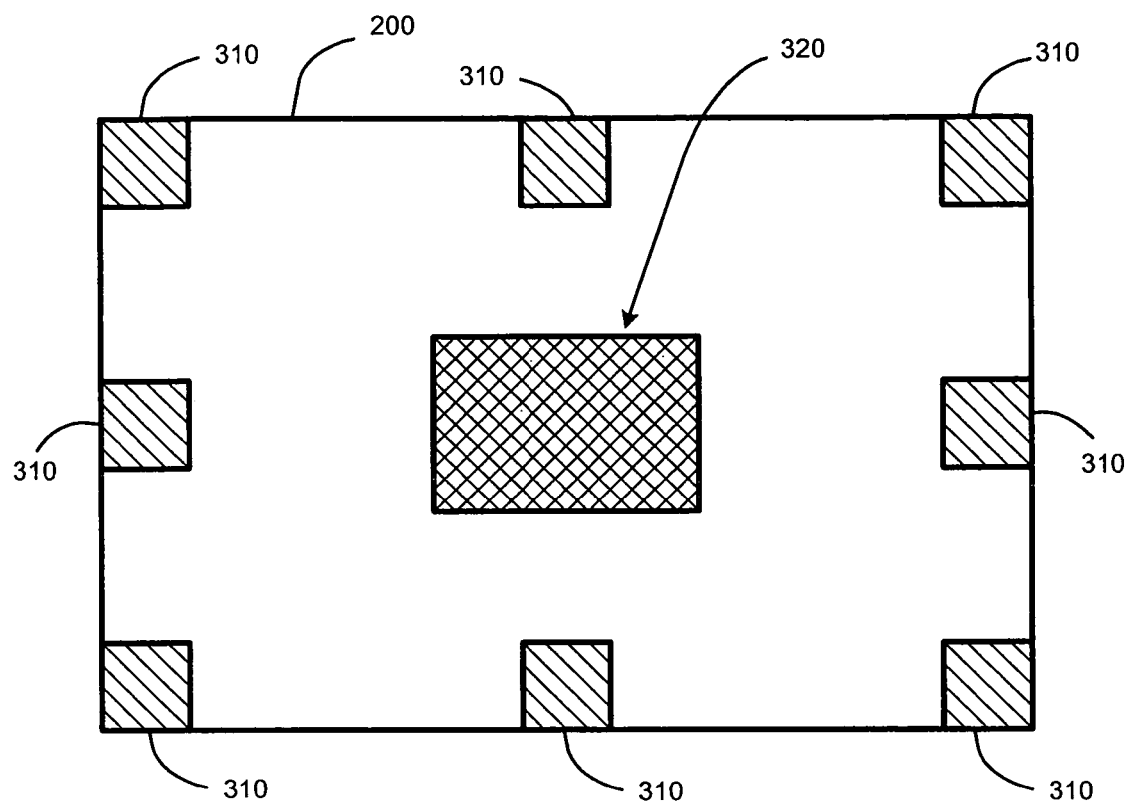
FIG. 3 illustrates regions sampled from an input image for use in initializing Gaussian mixture models and object boundary curve estimates.

The initial level set surface is initialized by a signed distance transform with respect to a rectangular region in the center of the image that is assumed to contain at least some portion of the object of interest. For initialization of the boundary curve evolution, the length and width of this rectangular region is initially set to some desired percentage of the overall image size. For example, in a tested embodiment, the length and width of this rectangular region was set to be on the order of about ⅛ of the image width and length. See FIG. 3 for an example of such sampled regions 320 at the center of the input image 200. As noted above, in one embodiment, the location of this initially sampled region may also be selected manually by the user rather than simply selecting this initial sample at the center of the image.

When initializing the foreground model, the first step is to sort the pixels inside the initial rectangular region according to the intensity value L of each pixel. As noted above, in the case of business cards, it is assumed that the business cards have a bright background and a dark foreground (i.e., dark text and/or images on a light background). Consequently, in such a case, $K_F=2$ average values are taken from the 5-dimensional feature vectors of some percentage of the lightest pixels and some percentage of the darkest of pixels as seeds for a mean-shift mode seeking on the feature space of the whole image. In a tested embodiment, a value on the order of about 10% of the lightest pixels and 10% of the darkest pixels was observed to work well for this initialization.

The two modes obtained from this initial pixel sampling are then adopted as the initialization of $\mu_1^F$ and $\mu_2^F$. The mixture weights $\pi_1^F$ and $\pi_2^F$ are then both initialized as 0.5 (since the weights sum to 1, as described above). Each covariance matrix $\Sigma_i^F$ is initialized as the same diagonal covariance matrix, i.e., the variance of the spatial component (x,y) are initialized as some percentage of the image width and height, respectively. In a tested embodiment, initialization values on the order of around ⅕ of the image width and height were observed to work well for the case of business cards. Finally, the variance of the color components $\{L,U,V\}$ are all initialized to a nominal value. In a tested embodiment, a nominal value for this variance on the order of about 25 was found to work well. However, it should be noted that it is not necessary to carefully tune any of the initialization parameters described above in order to obtain good segmentation results.

When initializing the background model, some number of average feature vectors in small regions sampled around the outer boundary of the image are adopted as the initialization of the mean-shift mode seeking algorithm in the full image feature space. For example, in a tested embodiment, $K_B=8$ average feature vectors of pixels inside eight 10×10 pixel rectangles around the outer boundary of an image, having a size of 320×240 pixels, which are circled around the outer boundary of the image, were adopted as the initialization of the mean-shift mode seeking algorithm in the full image feature space. See FIG. 3 for an example of such sampled regions 310 around the border of the input image 200. Note that larger or smaller regions (or more or fewer regions) may be sampled depending upon the size of the image. The eight recovered feature modes are then adopted as the initialization of each $\mu_i^B$ of $P_B(u)$. Note that the covariance matrices $\Sigma_i^B$, i=1, . . . , 8 (in the case of 8 feature modes) have the same initialization with those of the foreground model $P_F(u)$, and each $\pi_i^B$, i=1, . . . , 8, is set to be ⅛.

When initializing the foreground/background mixture weight, these weights, $\omega_F$ and $\omega_B$, are initialized to be equal to 0.5 (since the weights sum to 1, as described above).

Following the initialization described above, the iterative process described in Section 3 is performed until either convergence of the foreground region detection is achieved, or some desired maximum number of iterations has been performed without convergence. In a tested embodiment, convergence was assumed to have been achieved when the whenever the foreground region changed by less than approximately 1% in two consecutive iterations. It should be noted that while this 1% change criterion may seem rather rough, it has been observed to work well in a tested embodiment of the Image Segmenter for segmenting business cards from arbitrary images. Other convergence criteria may be appropriate for segmentation of other types of objects of interest.

Figure 4:
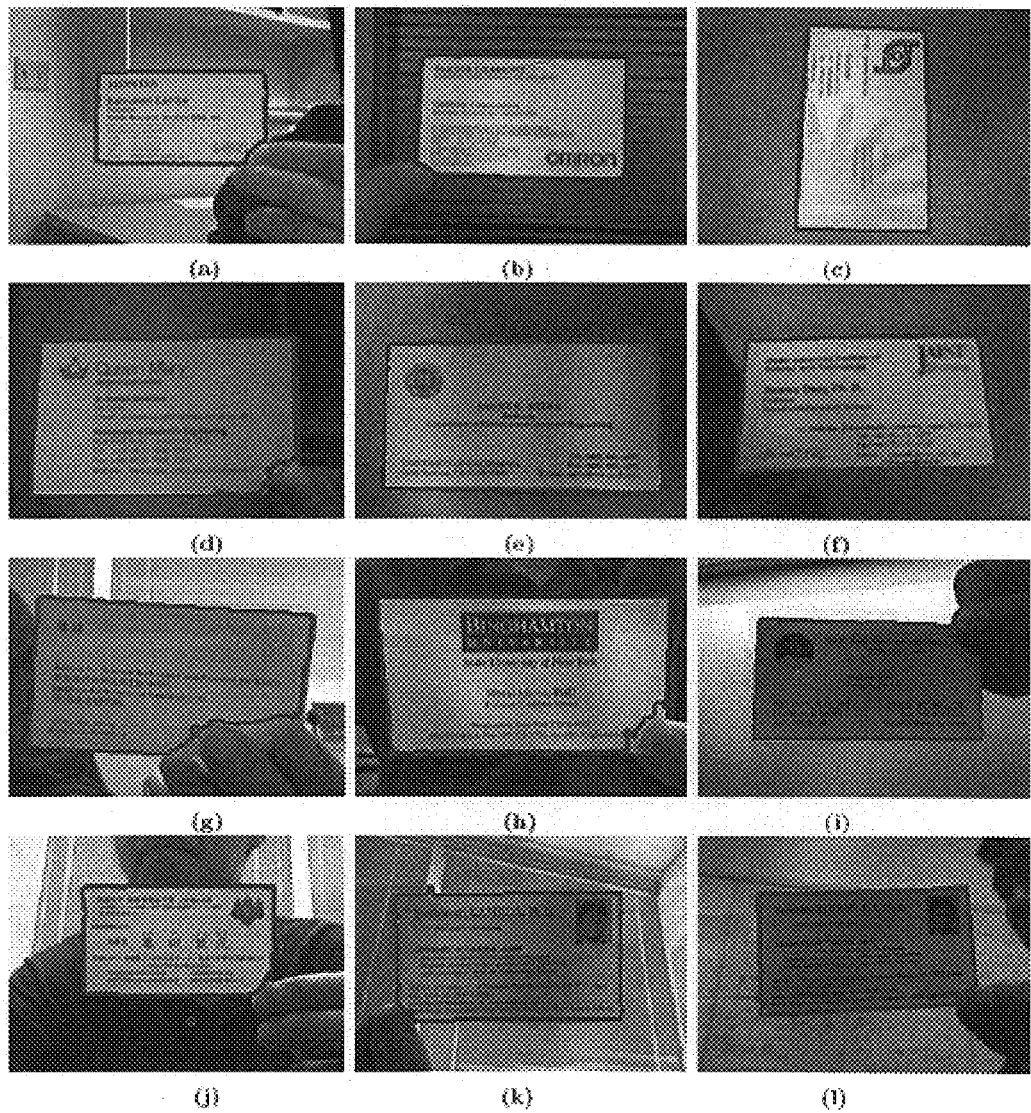
FIG. 4 illustrates use of the Image Segmenter to identify boundary curves of business cards contained within arbitrary images.

An example of the segmentation results of different business card in various backgrounds (images (a) through (l)) is provided in FIG. 4. In this figure, the evolved boundary of the business card is overlaid as red line in each image, with the inside of the closed red curve being regarded as the business card, while everything on the outside of that curve is regarded as the background.

4.1.2 Shape Rectification:

The physical shape of a business card is usually rectangular. However, as discussed above, in the image formation process, the rectangle shape of the business card will usually be projected as a quadrangle shape in the image. Consequently, the text or images on the business card in the image will be skewed. Therefore, in one embodiment, the quadrangle shape of the segmented business card is transformed back to a rectangle using an estimate of the physical aspect ratio of the business card. Note that transforming the shape of the business card also serves to rectify the skewed text at the same time.

Since the business card is a planar object, it is well known to those skilled in the art that rectification of objects such as a business card can be easily achieved by a homography transform. It is also well known that only four pairs of correspondence points are needed to solve for a homography matrix. In fact, it is natural to choose the four corner points of the quadrangle since they are direct correspondence of the four corner points of the physical business card. Further, to make the rectified text to look natural, it is necessary to estimate the physical aspect ratio of the business card since there is no way to obtain the true physical size of the business card from a single view image. Fortunately, by making reasonable assumptions about the camera model which are easy to satisfy, given the image coordinates of the four corner points of the quadrangle, the physical aspect ratio of the rectangle can be robustly estimated given that the quadrangle is the projection of a physical rectangle shape.

Therefore, the problem that needs to be addressed once the boundary curve of the quadrangle has been identified is to locate the four corner points of the quadrangle in the image. Since the segmentation subsystem described above returns a clock-wise chain code of the closed boundary of the business card, it is possible to identify these corner points by evaluating the points of the boundary curve. Note that the corner points may not necessarily be on the boundary curve itself since it is quite possible that at least one corner point is occluded by the fingers of a person who is holding the business card, as illustrated by images (a), (b), (d), (g), (h), (i), (j), (k) and (l) in FIG. 4.

In identifying the corner points of the quadrangle, the corner solution is generally achieved by fitting combinations of four lines to find a best quadrangle based on the boundary curve points and business card region. In a tested embodiment, this was achieved through a two step process involving curve simplification and optimized quadrangle fitting to the simplified curve.

For example, the boundary chain code obtained for the points of the boundary curve is a dense polygon representation of the segmented area. In other words, each vertex point is in a 3×3 neighborhood of its neighboring vertex. Typically, this has been observed to result in over 200 vertex points in a relatively small 320×240 pixel image. However, since the quadrangle can theoretically be represented by only four points, this number of vertex points is too redundant. Therefore, without losing much accuracy, the curve simplification procedure described below operates to reduce the reduce the number of vertices to a much smaller number, on the order of around 10 to 20 vertices.

In particular, denoting the set of n vertex points obtained from the segmentation subsystem as $V=\{v_0, v_1, v_2, \ldots, v_{n-1}\}$ with $v_0$ also being the neighbor of $v_{n-1}$ (since the boundary curve is a closed curve), the following two steps are performed for curve simplification:

1) Corner Point Detection: First, a multi-scale corner point detection is performed. This corner point detection is accomplished by defining $(i)_m = i \mod m$, for $i=0, \ldots, n-1$, to check to see if a vertex $v_i$ represents a corner point in accordance with Equation 32:

$$\left|\frac{(v_{(i-j)_n} - v_i) \cdot (v_{(i+j)_n} - v_i)}{\|v_{(i-j)_n} - v_i\| \|v_{(i+j)_n} - v_i\|}\right| < 0.98 = \cos(10°) \quad \text{Eqn. 32}$$

If Equation 32 is satisfied for all $j=1, \ldots, m$ (with m=20 in a tested embodiment), then $v_i$ is kept in the vertex set, otherwise it is discarded from the vertex set. This step in principle removes vertex points with small transitions over multiple scales. The reduced m vertex set is denoted as $\tilde{V}=\{\tilde{v}_0, \tilde{v}_1, \tilde{v}_2, \ldots, \tilde{v}_{m-1}\}$ where $\tilde{v}_0$ and $\tilde{v}_{m-1}$ are again neighboring vertices.

2) Vertex Pruning: Next, the vertex set is further reduced by an iterative minimum error vertex pruning operation. In particular, for $i=0, \ldots, m-1$, the Euclidean distance $d_i = d(\tilde{v}_i, \widetilde{\tilde{v}_{(i-1)_m} \tilde{v}_{(i+1)_m}})$ is evaluated from $\tilde{v}_i$ to the straight line formed by its backward and forward neighbor vertices $\tilde{v}_{(i-1)_m}$ and $\tilde{v}_{(i+1)_m}$. Specifically, suppose $\tilde{v}_k$ is such that $d_k = \min_i\{d_i\}$, if $d_k < \epsilon_d$, where $\epsilon_d$ is a pre-specified error tolerance (set as a value of 1 in a tested embodiment), then $\tilde{v}_k$ is simply removed from $\tilde{V}$. This process is repeated until no more vertices can be removed from the set. This returns the final reduced set of l vertex points, $\hat{V}=\{\hat{v}_0, \ldots, \hat{v}_{l-1}\}$.

Given the final set of vertices, $\hat{V}$, quadrangle fitting is approached as an optimization problem. First, a set of all possible straight line candidates is constructed for the quadrangle boundary based the pruned set of vertices $\hat{V}$. This set of line candidates is then evaluated to find the combination of four lines which returns a highest score according to the quadrangle scoring criterion described below. The highest scoring set of lines is then returned as representing the final quadrangle.

In particular, the boundary line candidate set is constructed as follows: for each $i=0, \ldots, l$, an ordered candidate boundary line set $L_i = \{\widehat{\hat{v}_i \hat{v}_{(i+1)_l}}, \ldots, \widehat{\hat{v}_i \hat{v}_{(i+n_d)_l}}\} = \{l_{i1}, \ldots, l_{in_d}\}$ is constructed where $n_d$ is an integer value which specifies how far forward to look (in the vertex set) to form the line candidates from any one specific vertex. In a tested embodiment, $n_d$ was set to a value of 4. This process results in the ordered set of all the boundary line candidates $L=\{L_1, L_2, \ldots, L_l\}=\{l_0, l_2, \ldots, l_p-1\}$. Note that the order of the lines is also ordered according to the ordering of the vertices.

Given this ordered set of boundary line candidates, then next step is to evaluate the resulting quadrangles. In particular, denoting $Q_{ijkl}$ as the quadrangle spanned by candidate lines $\{l_i, l_j, l_k, l_l\}$ where $i<j<k<l$, $\{\theta_{ijkl}^0, \theta_{ijkl}^1, \theta_{ijkl}^2, \theta_{ijkl}^3\}$ represents the four corner angle spanned by the four lines. Then, $N_F$, $N_Q$ and $N_{F \cap Q}$ are defined as the number of pixels identified as foreground (business card) pixels, the number of pixels inside the quadrangle $Q_{ijkl}$ and the number of pixels in the intersection of the former two sets, respectively. In addition, $n_c$ is defined as the number of vertex points in V which are in the $d_c$ neighborhood of the four line segments formed by the four lines $\{l_i, l_j, l_k, l_l\}$. In a tested embodiment, $n_c$ was set to a value of 3. Also note that there are n vertices in the vertices set V.

Given these parameters, the fitness of each possible candidate quadrangle is evaluated by Equation 33, as follows:

$$S_Q = \frac{n_c}{n} \sqrt[4]{\prod_{i=0}^{3}(1-|\cos\theta_{ijkl}^i|)} \sqrt{\frac{N_{F \cap Q}}{N_Q} + \frac{N_{F \cap Q}}{N_F}} \quad \text{Eqn. 33}$$

The candidate quadrangle, $Q_{ijkl}$, with the largest score, $S_Q$, is regarded as the best quadrangle. In principle the cost function $S_Q$ favors the quadrangle whose boundary and enclosed region coincides most closely with the boundary and enclosed region of the original segmentation results. This cost function also favors the quadrangle whose corner angles are near $\pi/2$. Furthermore, in one embodiment, post-processing is performed by collecting the Sobel edge points in the neighborhood of each boundary line and then performing a weighted least square fitting to further refine the position of each of the side lines of the quadrangle shape.

The most computation intensive part of the above-described optimization process is the evaluation of area ratio term $$\sqrt{\frac{N_{F \cap Q}}{N_Q} + \frac{N_{F \cap Q}}{N_F}} \text{ in } S_Q$$

since it must count the intersection of two regions in the image. Consequently, in one embodiment, one or more of the following heuristics have are used to further reduce the computational overhead of the quadrangle optimization computations:

1. If the length of a line segment $\overline{v_i v_{(i+j)}}$, $1 \leq j \leq n_d$ is less than approximately 1/16 of the minimum of the image width and length, then that line segment is not added to the boundary line candidate set.
2. If any of the corner points of the quadrangle $Q_{ijkl}$ falls out of the boundaries of the original image, then the quadrangle is simply discarded without evaluating its score $S_Q$.
3. If $$\frac{n_d}{n} < 0.5$$

for $Q_{ijkl}$, then the quadrangle is discarded without evaluating the other term of $S_Q$.
4. If $|\cos \theta_{ijkl}^i| > 0.2$ for any $i=0, \ldots, 3$, then the quadrangle is discarded without further evaluation as it is unlikely that the quadrangle is valid based on the angles of that quadrangle.

Using this set of heuristics can significantly reduce the potential number of quadrangles to be evaluated, thereby significantly reducing the computational overhead required for identifying the best quadrangle.

Once the best quadrangle shape $Q^*_{ijkl}$ has been obtained for the business card in the image, it is easy to identify the four corner points. Then given these points, the physical aspect ratio of the rectangle is estimated by $$R_\alpha = \frac{W_l}{W_h}$$

of the business card. Then, to rectify the quadrangle, it is necessary to determine the size of the rectangle after rectification. Since it is desired to preserve as much image information as possible, i.e., each image pixel inside the quadrangle in the image must have a direct map in the rectified rectangle image, the length of the rectified rectangle $L_r$ and width $W_r$ of the rectified rectangle are set to suitable values to achieve this mapping.

First, the longest side of the quadrangle is identified and denoted as $L_q$. The longest of the immediate neighbors of $L_q$ is then denoted as $W_q$. Then, if $R_\alpha W_q > L_q$, then $W_r = W_q$ and $L_r = R_\alpha W_q$, where $W_r$ and $L_r$ represent the width and length of the rectified rectangle, otherwise $L_r = L_q$ and $$W_r = \frac{L_r}{R_\alpha}.$$

At this point, the four corner points of the rectified rectangle are set as $(0,0)$, $(L_r,0)$, $(L_r,W_r)$ and $(0,W_r)$, with these four points corresponding to the four corner points of the optimal quadrangle identified as described above. A simple homography is then estimated from the four pairs of corresponding points, and the quadrangle shaped image patch is warped to the rectified rectangle by reverse mapping the image pixels of the quadrangle to the rectified rectangle using a technique such as bi-linear color pixel interpolation.

Figure 5:
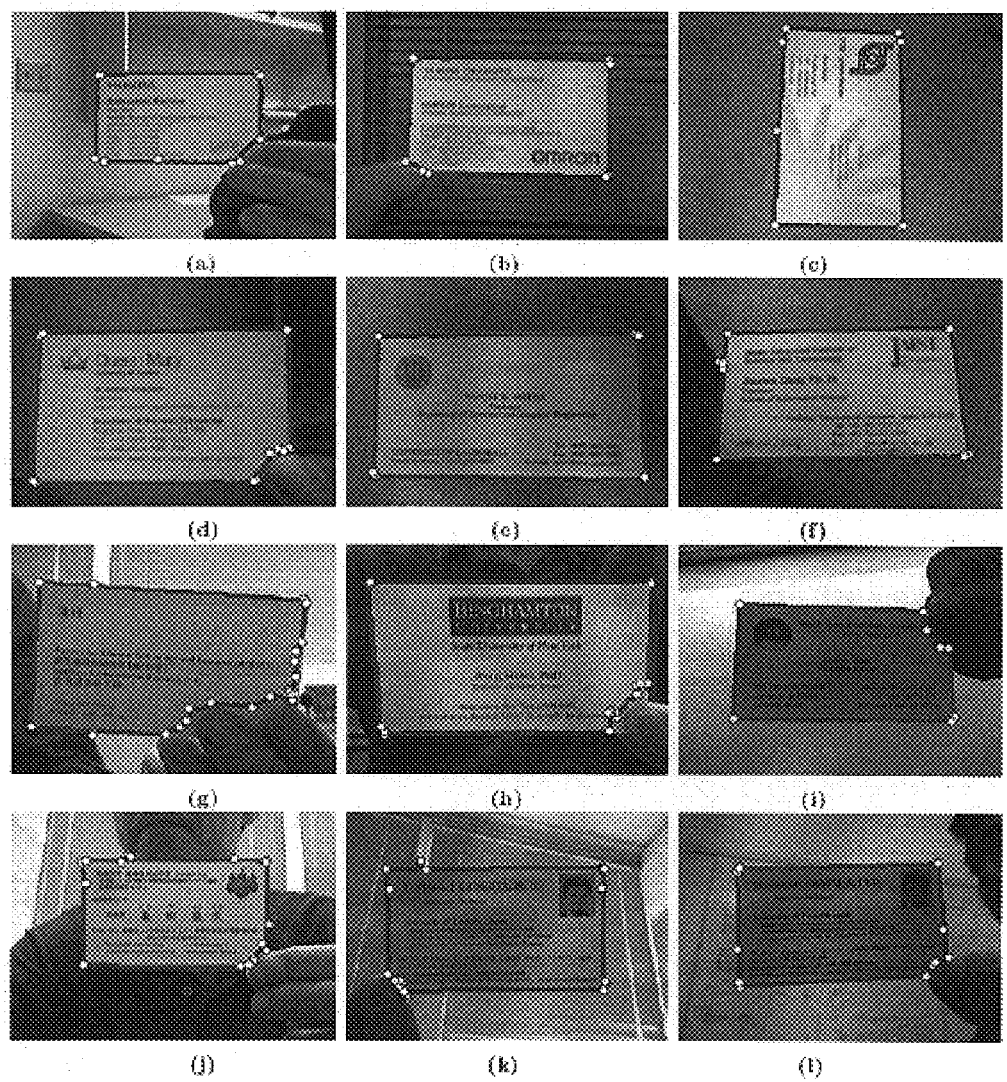
FIG. 5 illustrates results of boundary curve simplification through reduction of curve vertices with respect to the boundary curves of FIG. 4.
Figure 6:
FIG. 6 illustrates results of optimized quadrangle fitting to the simplified boundary curves of FIG. 5.
Figure 7:
FIG. 7 illustrates the results of rectification of the business cards of FIG. 6 as a function of the optimized quadrangle fitting illustrated in FIG. 6.

The processes described above with respect to curve simplification, quadrangle optimization, and object rectification are graphically illustrated with respect to FIG. 5 through 7. In particular, FIG. 5 illustrates the results of curve simplification based on the segmentation results of the images shown in FIG. 4. In FIG. 5, the blue curve overlaid in each of the images ((a) through (l)) is the boundary curve from the segmentation process described above, and the white points are the finally simplified vertices of the boundary curve. It can be observe that the curve simplification process described above significantly reduces the number of vertices of the curve while the simplified curve still represents the originally curve with high accuracy.

Next, FIG. 6 illustrates the results of quadrangle fitting using the quadrangle optimization process described above. In this figure, the green, blue, red and yellow corner points in each image ((a) through (l)) correspond to the $(0,0)$, $(L_r,0)$, $(L_r,W_r)$ and $(0,W_r)$ coordinates of the rectified rectangle respectively. In addition, the optimal quadrangle shape is overlaid with red lines in each image to illustrate how close it is fitted with the original boundary curve (blue lines) and the region recovered from the initial segmentation process. Further, it should be noted that occluded corner points (mostly occluded by fingers) are recovered through optimal quadrangle fitting described above.

Finally, FIG. 7 illustrates the results of rectifying the quadrangle shaped business cards segmented from the original images based on the estimated optimal quadrangle shapes shown in FIG. 6. Note how the skewed business card text characters on the original image were rectified along with the rectification of the overall business card. Further, it should also be noted that as illustrated by FIG. 7, business card images of different aspect ratios easily processed and correctly rectified.

4.1.3 Business Card Image Enhancement:

There are a large number of conventional techniques that can be used to improve the readability or legibility of the rectified business cards (or other segmented objects). However, in a tested embodiment, the contrast between the text characters and the background in the rectified business card images was sharpened by independently transforming the R, G, B pixel value through a same "S" shape curve by Hermite polynomial interpolation on the average intensity $\overline{L}_l$ of the lightest 10% and the average intensity $\overline{L}_d$. In principle, the curve should map the pixel value larger or equal to $\bar{L}_l$ and pixel value less or equal to $\bar{L}_d$ to near 255 and 0, respectively.

Figure 8:
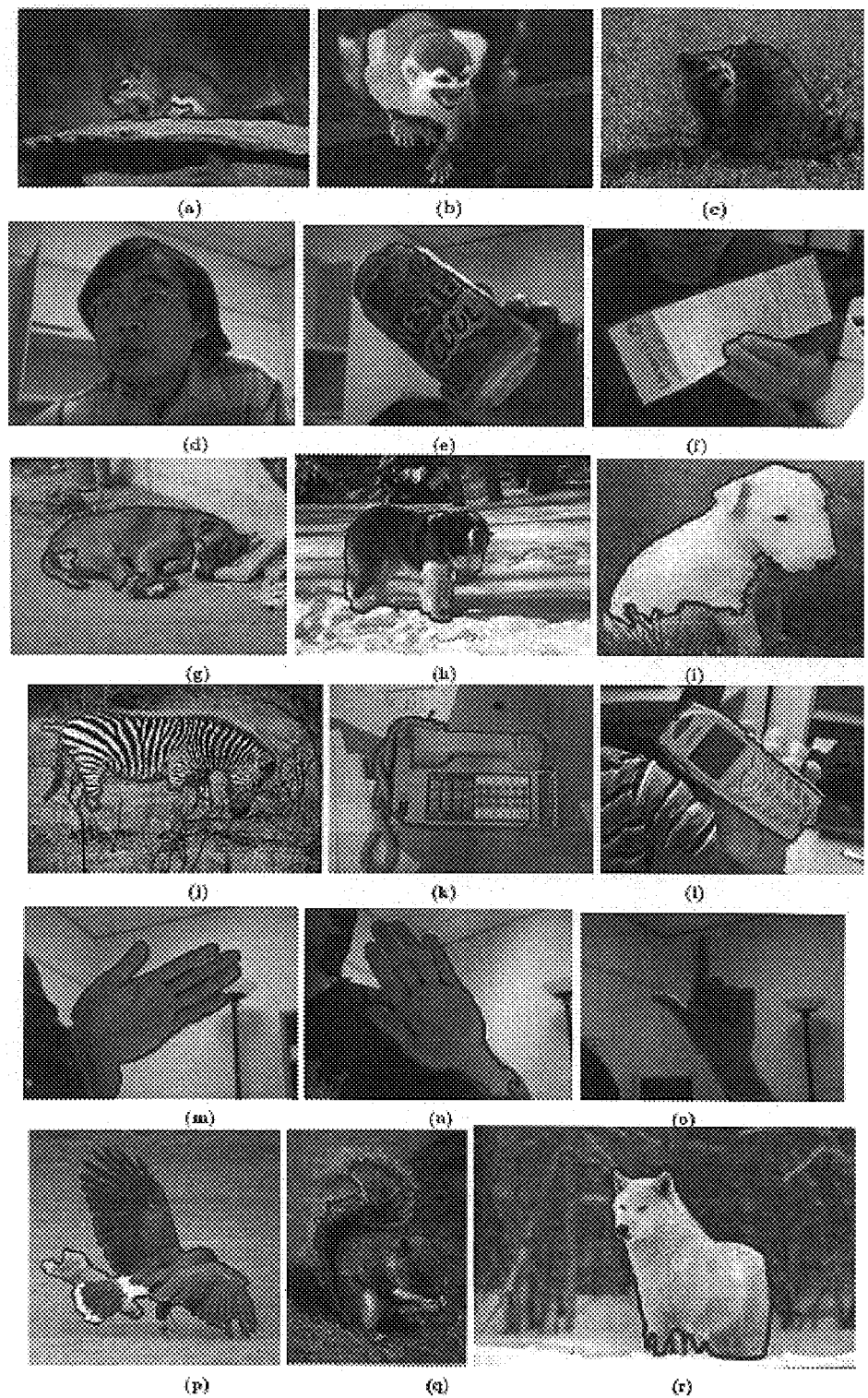
FIG. 8 illustrates boundary curves identified for various objects of interest in a set of arbitrary images.

4.2 Segmentation of Other Objects:

Using the same techniques (and initialization settings) described above in Section 4.1 for segmentation of business cards, it is possible to obtain successful segmentation of a large variety of objects of interest from arbitrary images. For example, as illustrated by FIG. 8, a variety of various objects were successfully segmented from arbitrary images, as illustrated by the boundary curves shown in images (a) through (r) of FIG. 8. However, it should be noted that for arbitrary objects, better results can potentially be achieved by tuning the number of the components of the foreground Gaussian mixture model to better approximate the type of object to be segmented from the image. On the other hand, the segmentation results illustrated in FIG. 8 were all obtained using the same 2-component foreground Gaussian mixture model used to segment business cards in the preceding example. Consequently, it should be clear that the Image Segmenter described herein has the ability to deal with many segmentation scenarios using even a simple 2-component foreground Gaussian mixture model.

4.3 Generalized Fitting and Rectification of Polygons:

As described in Section 4.1 with respect to the segmentation of rectangular business cards, some information is known in advance about the objects of interest. Specifically, it is known that the business cards are rectangular, but that the images of the business cards are likely to be skewed into a more general quadrangle which may also be partially occluded. As described above, this information is then used in fitting an optimal quadrangle to the boundary curve that was iteratively evolved for business card following a reduction in number of vertices through corner point detection and vertex pruning.

However, in the case where the objects of interest are represented by polygons of other known shapes, such as, for example, triangles, pentagons, octagons, etc., the optimized quadrangle fitting described above can be easily adapted to a more generalized optimized polygon fitting, even in the case of partial occlusion. In this case, rather than using sets of four candidate lines, as in the quadrangle case, candidate sets of n lines are used, where n represents the number of sides of the known target polygon. This optimal polygon is then fitted to the object of interest. Processing and rectification of that object then proceeds in a manner similar to that described above with respect to the rectification of the quadrangle shapes into regular rectangles.

Further, in a related embodiment, if it is assumed that the shape has some regular polygon structure which is not occluded, but whose number of sides is unknown, then optimal polygon fitting can still be achieved in a manner similar to that described above. In particular, in this case, rather than fitting a single optimal polygon to the object of interest, a series of optimized polygons between a maximum and minimum number of sides will be fit to the object of interest. The fit of each of these optimal polygons will then be evaluated to see which of the polygons best fits the object of interest. Specifically, as with the quadrangle case, the polygon whose boundary and enclosed region coincide most closely with the boundary and enclosed region of the original segmentation results will be selected as the optimal polygon.

The foregoing description of the Image Segmenter has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Image Segmenter. It is intended that the scope of the invention be limited not by this detailed description, but rather by the claims appended hereto.

What is claimed is:

1. A system for automatically identifying a boundary curve for delimiting an object of interest within an image frame, comprising using a computing device to perform the steps for:
   receiving an image frame containing an object of interest;
   sampling separate areas of the image frame to initialize separate probabilistic color distribution models of a single foreground region and a single background region of the image frame, said probabilistic models of the foreground and background regions jointly comprising a local image data likelihood covering the entire image;
   initializing a global image data likelihood as a function of a combination of the probabilistic models of the foreground and background regions of the image frame;
   initializing a boundary curve as a boundary surrounding the area of the image frame sampled to initialize the probabilistic model of the foreground region; and
   jointly performing an iterative minimization of energy functionals representing the boundary curve, the local image data likelihood and the global image data likelihood to generate a final boundary curve for delimiting the object of interest.

2. The system of claim 1 further comprising refining the final boundary curve as a function of prior knowledge of object shapes.

3. The system of claim 1 further comprising segmenting the object of interest from the image frame with respect to the final boundary curve.

4. The system of claim 1 wherein sampling the image frame to initialize the probabilistic model of the background region comprises sampling image pixels in a plurality of regions along an outer boundary of the image frame.

5. The system of claim 1 wherein sampling the image frame to initialize the probabilistic model of the foreground region comprises sampling a plurality of image pixels in a region located in the center of the image frame.

6. The system of claim 1 wherein sampling the image frame to initialize the probabilistic model of the foreground region comprises sampling a plurality of image pixels in a region of the image selected via a user interface, said user selected region at least partially overlapping the object of interest.

7. The system of claim 1 wherein the iterative minimization of the energy functionals comprises repeating steps for:
   minimizing an energy of the boundary curve with the local and global probabilistic models fixed; and
   minimizing an energy of the local and global probabilistic models with the boundary curve fixed.

8. The system of claim 7 wherein the iterative steps for minimization of the energy functionals repeats until any of:
   a convergence is achieved; and
   a maximum number of iterations have been completed.

9. A physical computer readable medium having computer executable instructions stored therein for automatically segmenting an object of interest from an image frame, said computer executable instructions comprising:
   sampling an input image in a plurality of regions along an outer edge of the input image to construct an initial single Gaussian mixture model representing a color distribution of the input image background;
   sampling the input image in a region assumed to include a least a portion of the object of interest to construct an initial single Gaussian mixture model representing a color distribution of the input image foreground;

initializing a boundary curve as a curve encompassing the region sampled for construction of the foreground Gaussian mixture model;

initializing a single global Gaussian mixture model as a weighted function of the foreground and background Gaussian mixture models covering the entire input image;

constructing a local energy functional from a weighted combination of the foreground and background Gaussian mixture models;

constructing a global energy functional from the global Gaussian mixture model;

jointly performing an iterative minimization of an energy functional representing the boundary curve, the local energy functional, and the global energy functional for evolving a final boundary curve for delimiting the object of interest; and segmenting the object of interest from the input image as a function of the final boundary curve.

10. The computer-readable medium of claim 9 wherein sampling the input image in a region assumed to include a least a portion of the object of interest comprises automatically sampling the image pixels in a region located at the center of the input image.

11. The computer-readable medium of claim 9 wherein sampling the input image in a region assumed to include a least a portion of the object of interest comprises sampling a region of the input image identified via a user interface.

12. The computer-readable medium of claim 9 wherein jointly performing an iterative minimization of energy functionals representing the boundary curve, the local energy functional, and the global energy functional computer executable instructions steps for:

minimizing an energy of the boundary curve with the local and global energy functionals held fixed; and minimizing an energy of the local and global energy functionals with the boundary curve fixed.

13. The computer-readable medium of claim 9 wherein the joint iterative minimization of the energy functionals continues until any of:

achieving a convergence of energy functional values; and
completing a predefined maximum number of iterations.

14. A computer implemented process for identifying an object of interest within an image, comprising using a computer to:

sample an image to construct an initial single Gaussian mixture model representing a color distribution of the image background;

sample a region of the image to construct an initial single Gaussian mixture model representing a color distribution of the image foreground;

initialize a boundary curve to encompass the region sampled for construction of the foreground Gaussian mixture model;

initialize a global Gaussian mixture model as a weighted function of the foreground and background Gaussian mixture models covering the entire image;

jointly performing an iterative minimization of the energy of:
the boundary curve,
a combination of the foreground and background Gaussian mixture models, said combination representing a local Gaussian mixture model, and
the global Gaussian mixture model; and wherein the joint iterative minimization results in the evolution of a final boundary curve for delimiting the object of interest.

15. The computer implemented process of claim 14 further comprising segmenting the object of interest from the image as a function of the final boundary curve.

16. The computer implemented process of claim 14 wherein performing the joint iterative minimization comprises repeating a set of steps including:

minimizing an energy of the boundary curve with the local and global Gaussian mixture models held fixed; and minimizing an energy of the local and global Gaussian mixture models with the boundary curve held fixed.

17. The computer implemented process of claim 16 wherein the set of steps is repeated until such time as convergence of the local and global Gaussian mixture models and has been reached.

18. The computer implemented process of claim 16 wherein the set of steps is repeated until such time as a predefined maximum number of iterations has been reached.

19. The computer implemented process of claim 14 wherein sampling the image to construct the initial Gaussian mixture model of the image background comprises sampling image pixels in a plurality of regions along an outer boundary of the image.

20. The computer implemented process of claim 14 wherein sampling the region of the image to construct the initial Gaussian mixture model of the image foreground comprises sampling any of:

the image pixels in a region located in the center of the image; and
the image pixels in a user specified region of the image.

* * * * *